(12) United States Patent
Heide et al.

(10) Patent No.: US 6,894,572 B2
(45) Date of Patent: May 17, 2005

(54) DEVICE FOR PRODUCING AN OSCILLATOR SIGNAL

(75) Inventors: Patric Heide, Vaterstetten (DE); Martin Nalezinski, München (DE); Richard Roskosch, Ottobrunn (DE); Martin Vossiek, Hildesheim (DE)

(73) Assignee: SIEMENS Aktiengesellschaft, Munich (DE)

( * ) Notice: Subject to any disclaimer, the term of this patent is extended or adjusted under 35 U.S.C. 154(b) by 4 days.

(21) Appl. No.: 10/312,819

(22) PCT Filed: Jun. 26, 2001

(86) PCT No.: PCT/DE01/02344
§ 371 (c)(1), (2), (4) Date: Sep. 10, 2003

(87) PCT Pub. No.: WO02/03096
PCT Pub. Date: Jan. 10, 2002

(65) Prior Publication Data
US 2004/0108904 A1 Jun. 10, 2004

(30) Foreign Application Priority Data
Jul. 6, 2000 (DE) .......................................... 100 32 822

(51) Int. Cl.[7] ................................................. H03B 5/34
(52) U.S. Cl. .......................................... 331/74; 331/10
(58) Field of Search ............................. 331/74, 10, 76, 331/18, 14, 25, 44, 177 R

(56) References Cited

U.S. PATENT DOCUMENTS

| 3,299,424 A | 1/1967 | Vinding |
| 4,006,477 A | 2/1977 | Yost, Jr. et al. |
| 4,218,680 A | 8/1980 | Kennedy |
| 4,245,354 A | 1/1981 | Guest |
| 4,786,903 A | 11/1988 | Grindahl et al. |
| 5,359,727 A | * 10/1994 | Kurita et al. ................ 713/400 |
| 5,453,748 A | 9/1995 | Lindell |
| 5,630,216 A | 5/1997 | McEwan |
| 5,839,059 A | * 11/1998 | Hakkinen et al. ......... 455/115.1 |
| 6,081,222 A | 6/2000 | Henkel et al. |
| 6,163,223 A | * 12/2000 | Kapetanic et al. ............. 331/2 |
| 6,816,021 B2 | * 11/2004 | Hahn et al. .................... 331/74 |

FOREIGN PATENT DOCUMENTS

| DE | 199 46 161 | 4/2001 |
| DE | 199 46 168 | 4/2001 |
| EP | 1 014 587 | 6/2000 |
| GB | 2 343 571 | 5/2000 |

OTHER PUBLICATIONS

M. Wollitzer et al., Supramonic Injection Locking Slot Oszillators, Electronics Letters, Oct. 28, 1993, vol. 29. No. 22.

Klaus Finkenzeller, "RFID–Handbuch", 2. Auflage, Carl Hanser Verlag, Munchen, 1999.

C. Luxey et al., "A Retrodirective Transponder with Polarization Duplexing for Dedicated short–range Communications", IEEE Transactions on Microwaves Theory and Technics, vol. 47, No. 9.

M.M. Kaleja et al., Imaging RFID System at 24 Gigahertz for Object Localization, 1999 IEEE MTT–S International Microwave Symposium, Anna Hein, USA, vol. 4.

* cited by examiner

Primary Examiner—Henry Choe
(74) Attorney, Agent, or Firm—Young & Thompson

(57) ABSTRACT

The invention relates to a device and a method for producing an oscillator signal based on a base signal. Said oscillator signal is actively constructed by an oscillator. The oscillator can be quasi-phase-coherently excited by the base signal.

20 Claims, 2 Drawing Sheets

DEVICE FOR PRODUCING AN OSCILLATOR SIGNAL

CROSS REFERENCE TO RELATED APPLICATIONS

This is the 35USC 371 national stage of international application PCT/DE01/02344 filed on Jun. 26, 2001, which designated the United States of America.

FIELD OF THE INVENTION

The invention relates to a device and a method for generating an oscillator signal based on a base signal.

BACKGROUND OF THE INVENTION

In the field of radio frequency engineering, it is advantageous and usual to evaluate radio-frequency microwave signals not directly but in relation to a reference signal. This relates, for example, to systems for data transmission in which a transmitter, which will be called base station in the text which follows, sends a base signal and this base signal is compared with a reference signal which is generated in a receiver, and processed further in a receiving station. Thus, for example, mixers or demodulators are frequently used by means of which the received signal is down converted into a band of in most cases lower frequency by means of a reference signal. Since, as a rule, the radio-frequency base signal is only used as a carrier onto which a modulation or information of lower frequency is impressed, it is possible, for example, to suppress the carrier by means of this conversion and thus to derive the information contained in the modulation in a simpler manner.

In so-called transponder, transceiver, backscatter or also radar systems, a base signal, which is also called an interrogating signal in this case, is sent by the base station to the transponder or to a reflector and from here is transmitted back to the base station as a response signal, possibly modified, and is there received again. In most cases, the evaluation in the base station then takes place in such a manner that the transmitted base signal itself is used as the reference signal by means of which the response signal is evaluated in order to derive in this way, for example, information added in the transponder or a sensor information item such as, e.g. the delay of the signal and thus the length of the transmission link.

In such systems it is also usual that in the transponder, the received base signal is also processed with a reference signal before a response signal is sent back or, respectively, the reference signal itself, possibly with a characteristic information item added, is sent back to the base station. Such transponders with their own source for sending back the response will be called active transponders or active backscatter devices in the text which follows. By comparison, systems without their own source, that is to say those which only send back the base signal, possibly modified and amplified, are called passive.

In all cases it is advantageous if the reference signal is related as precisely as possible to the base signal or to its carrier with respect to frequency and phase. The more precise this frequency and phase relation, the simpler and/or the more interference-proof is the manner in which the information contained in the base signal or in the response signal can be derived. If the base signal is sent by a base station and received and processed further in the manner described in a spatially distant receiving station, this desired frequency and phase relation is not readily given since both signals, that is to say the base signal generated in the base station and the reference signal generated in the receiving station come from different sources.

For the above reasons, therefore, it is of general interest to couple the reference signal to the base signal in some way. For this purpose, different methods and arrangements are normally used. A simple frequency relation can be implemented by using oscillators with high frequency stability in the transmitter and in the receiver. However, an unknown residual frequency offset will always still remain in this case due to, for example, temperature or aging drift. For this reason, the phases of the two sources cannot have a fixed relation. More elaborate arrangements have means which are suitable for determining the residual frequency offset and/or the residual phase offset. On the basis of the deviation quantities determined, the base signal source or the reference signal source can then be controlled. For this purpose, different frequency and phase control loops are used. Similarly, additional interrogating signals or quantities can be formed from the residual signals, which are utilized for further signal processing. In the field of communications technology, a variety of methods for recovering a carrier are commonly used. The synchronization of oscillators by means of so-called "injection locking" also belongs to the prior art, see, for example, M. Wollitzer, J. Buechler and E. Bibbl, "Supramonic Injection Locking Slot Oscillators", Electronics Letters, 1993, Vol. 29, No. 22, pages 1958 to 1959. In this case, the oscillator to be controlled is in most cases locked onto a strong stable oscillator. The locking is usually done in CW (Continuous-Wave) mode and subharmonic oscillation modes can also be used for the application. In general, controlling the reference source on the basis of an interrogating signal becomes susceptible to interference and complicated, in particular, if the receiving station is operating not only as a pure receiver but sends back the interrogating signal, possibly provided with an additional information item, as response signal as a transponder, transceiver or active backscatterer. In this case, so-called multiplexing methods must be used for ensuring that the response signal which, as a rule, has a much higher amplitude than the interrogating signal, is not cross-coupled onto the receiving branch and/or onto the control loop. For example, time-division, frequency-division or polarization-division multiplexing methods are normally used. In the case of time-division multiplex, the receiving station first responds to the interrogating signal with a skew. The greater the skew and/or the higher the microwave frequency, the more complicated it is to maintain phase coherence between the source of the base station and that of the transponder. Even extremely small relative frequency deviations of the sources which cannot be avoided due to drift effects, phase noise and control inaccuracies lead to an undefined phase relationship of the sources within a relatively short time in the case of signals of very high frequency. In the case of frequency-division multiplex, the interrogating signal is converted to another frequency in the transponder before it is sent back. This requires dividers, multipliers or additional signal sources and mixers and possibly a number of antennas which are tuned to the respective frequencies. In practice, the principle of frequency multiplication or division also frequently fails because of the radio licensing since, as a rule, the frequencies of the released bands do not have an integral-numbered dividing ratio.

If it is intended to determine the distance or a change in distance between a base station and a transponder, for example in accordance with the principle of the Doppler or frequency-modulation radar, there are even further demands on the phase relation between the interrogating signal transmitted and the response signal sent back. In this case, the phase of the response signal sent back by the transponder must exactly correspond to the phase of the signal received in the transponder, if necessary apart from a constant offset, so that the interrogating signal sent by the base station and the response signal received by it after having been sent back by the transponder have a phase difference which is proportional to the distance between the base station and the transponder but otherwise does not change with time.

Since, in practice, it is only with great difficulty that this phase coherence between two radio-frequency sources can be achieved, passive backscattering transponders which do not have their own signal sources but only reflect back the interrogating signal, possibly amplified, are currently used in most cases. Such systems are described, for example, in Klaus Finkenzeller "RFID-Handbuch" [RFID Manual], second edition, Carl Hanser Verlag, Munich 1999. The disadvantageous factor in such passive backscattering systems is that the transmitted signal must travel along the path from the base station to the transponder as an interrogating signal and back as a response signal and, therefore, the signal/noise ratio of the entire transmission link decreases in proportion to the fourth power of the distance. Because the free-field loss greatly increases with frequency, it is scarcely possible to implement, in particular, passive backscattering transponders of very high frequency in the Gigahertz range with a satisfactory signal/noise ratio. This is unsatisfactory, in particular, because, in principle, because of the great bandwidth available, Gigahertz systems can be very advantageously used both for range finding and for fast data transmission.

In addition, there are systems in which the base signal is not simply reflected and possibly also amplified but in which the response signal is actively constructed on the basis of the base signal, e.g. by means of an active oscillator. For the active design, the relevant parameters are extracted from the base signal and the oscillator signal is generated independently on the basis of the extracted parameters. It represents a reconstruction of the base signal inasmuch as it corresponds to it in the required parameters. Beyond the mere reconstruction, other signal components can also be impressed on the oscillator signal in order to transmit, e.g. additional information.

If a new signal is generated in the transponder in this manner on the basis of a received signal by means of an active oscillator as independent source, the path from the base station to the transponder is in each case only traveled once by the signal from a source. In this case, the signal/noise ratio is only inversely proportional to the power of two of the distance. To this is added that other attenuations and losses on the transmission path act on the signal only once and not twice. The signal/noise ratio is, therefore, particularly in the case of greater distances and/or high frequencies, better by orders of magnitude than in the case of passive backscattering systems in which the signal must travel to and fro on the path from the base station to the transponder.

A more complex transponder system in which the transponder backscatterer operates with its own source is specified in German patent application 19946168.6. This system operates in time-division multiplex and bypasses some of the disadvantages shown by means of a clever choice of modulation and control. However, it is relatively elaborate. It uses the methods which are used in GPS (Global Positioning System). Other systems are mentioned, for example, in U.S. Pat. No. 5,453,748 or in C. Luxey, J.-M. Laheurte "A Retrodirective Transponder with Polarization Duplexing for Dedicated short-range Communications", IEEE Transactions on Microwaves Theory and Technics, Vol. 47, No. 9, pages 1910 to 1915, or in M. M. Kaleja et al., "Imaging RFID System at 24 Gigahertz for Object Localization, 1999 IEEE MTT-S International Microwave Symposium, Anna Hein, USA, Vol. 4, pages 1497 to 1500.

SUMMARY OF THE INVENTION

It is the object of the invention to demonstrate a particularly simple method by means of which it is possible to lock a signal source in the radio-frequency range quasi-phase-coherently to a reference signal. Quasi-phase-coherent means that the phase difference between the base signal and the reference signal generated is small, the term small being meant with respect to the intended communication or measuring task. As limit for a small phase deviation, for example, the value $\pi/10$, that is to say approx. 20° is frequently used. Such signals having only small phase deviations will be called quasi-phase-coherent in the text which follows and the time interval within which this coherence exists the duration of coherence.

The essential factor in this is that it is not only the oscillations of the active oscillator which are quasi-phase-coherent with respect to the base signal but the excitation of that active oscillator is also quasi-phase-coherent. Whereas the active oscillator in devices and methods of the prior art is excited by thermal noise and its oscillations are made quasi-phase-coherent only later by means of an elaborate control process and lock-in, the oscillator in the subject matter of the application is already excited quasi-phase-coherently by the base signal, that is to say its oscillation build-up is already quasi-phase-coherent and the phase coherence is thus established virtually automatically. The oscillation of the oscillator can thus be initialized quasi-phase-coherently or, respectively, is quasi-phase-coherently initialized.

The basic concept of the invention consists in that an oscillator in its basic state is in an unstable equilibrium and, when it is switched on, must first be excited into oscillation by being supplied with external energy of whatever type. It is only after this initial excitation that the feedback with which the oscillation is maintained becomes active. Usually, for example, the thermal noise is used for such an initialization of an oscillating circuit. This means that an oscillator starts to oscillate with a random phase and amplitude and then oscillates at its frequency predetermined by its resonant circuit. If, however, an external excitation signal is injected into the oscillator on switch-on, the frequency of which is within the bandwidth of the resonant circuit and the power of which is significantly above the noise power, the oscillator will start to oscillate not randomly but synchronously with the phase of the exciting base signal. This quasi-phase-coherence remains in existence at least for a time depending on the frequency difference between the exciting base signal and the oscillator signal and in dependence on the phase noise of the two oscillators.

The difference of the present invention with respect to the known passive devices and methods consists in the use of an active oscillator. Thus, the base signal is not simply reflected back but before it is sent back, an independent quasi-phase-coherent source is used to actively construct an oscillator signal almost free of noise. The system according to the invention thus has a significantly greater range than passive systems of the prior art whilst its operation is otherwise similar.

The oscillator signal of the active oscillator can be used as response signal or reference signal, depending on whether this is unidirectional or bidirectional signal transmission.

Furthermore, control loops for any carrier recovery can be omitted in the device according to the invention. In transponder arrangements, a particular advantage consists in that no time-division, frequency-division or polarization-division multiplex is necessary since the base signal and the oscillator signal do not influence each other or only influence each other in the desired manner at the beginning of the building-up process and after that are quasi-phase-coherent independently of one another.

It is advantageous if the device has a switching means for switching the quasi-phase-coherent exciteability of the active oscillator. This switching means is used for placing the active oscillator into a state from which, excited by the base signal, it can build up quasi-phase-coherently to the base signal oscillation.

To switch the exciteability, it is not absolutely necessary to switch the oscillations completely on and off. If, for example, the active oscillator can oscillate in different modes, a second mode can simply be switched while the first one continues to oscillate. Even with only one mode, the oscillation does not need to be switched off completely but, as a rule, attenuation is sufficient so that the base signal is sufficient for the next quasi-phase-coherent excitation.

If the exciteability of the active oscillator is switched on again after the coherence duration, the quasi-phase-coherence remains in existence over a relatively long period.

If, in further development, the quasi-phase-coherent exciteability of the active oscillator is repeated, the quasi-phase-coherence remains in existence even over relatively long periods. This can be achieved by the switching means being constructed in such a manner that it switches the active oscillator with a predetermined sequence. This sequence can be a complex sequence which by itself is a carrier of information, or also a cyclic repetition in the form of a clock rate.

The duration between successive switching of the exciteability preferably approximately corresponds to the coherence duration. However, a faster switching is also possible without the quasi-coherence between base and oscillator signal being lost. If, on the other hand, the quasi-phase-coherence is only necessary in particular time intervals, the duration between two successive switching-on processes of the exciteability can also be selected to be longer than the coherence duration. In the case of a cyclic sequence in the form of a clock, the cycles must be correspondingly adapted to the coherence duration.

If the switching of the active oscillator is repeated and the active oscillator repeatedly starts to oscillate quasi-phase-coherently with respect to the base signal, the oscillator signal generated by the active oscillator can be considered to be a sampled duplicate of the base signal. If the sampling theorem is adhered to, a signal is completely described by its samples. The off duration of the active oscillator is suitably not much longer than the on duration, that is to say not much longer than the coherence duration. Maintaining the sampling theorem is thus inherent because of the coherence condition. According to the sampling theorem, the phase difference between two sampling points must be less than 180°. This condition is less restrictive than the quasi-coherence condition. In consequence, from the point of view of information technology, the signal of the switched oscillator must be considered as a copy of the reference signal, in spite of the switching process, and carries the complete information of the former.

The exciteability of the active oscillator can be switched in a relatively simple way by switching the oscillator itself. Accordingly, the device can have a means for switching the active oscillator on and off. To switch the oscillator, any means which has the effect that the oscillating condition of the oscillator is given or, respectively, no longer given is suitable. Thus, e.g. in the oscillating circuit, the gain can be switched off, losses or delays (phases) can be changed or the feedback branch can be opened.

Apart from its fundamental mode, the active oscillator can also be excited quasi-phase-coherently in one of its subharmonic modes of oscillation. In this context, the fundamental mode or a subharmonic mode of oscillation of the base signal can be used for the excitation.

If the device is used for identification as ID tag or for communication, the coding can be done, for example by means of the sequence of switching the exciteability of the oscillator, particularly by the switching means having a clock rate in accordance with the desired coding. As an alternative, the device has an additional modulation unit by means of which the quasi-phase-coherent signal is modulated before it is sent back.

As already explained, the coherence duration depends on the frequency difference between base and oscillator signal. The more precisely the frequencies are matched, the longer the phases of the signals are almost identical. To increase the coherence duration, as a result of which the clock rate of the switching means can also be kept low, it may be advantageous to provide means which are suitable for adaptively adapting the oscillator frequency to the frequency of the base signal.

When selecting the active oscillator, attention must be paid to the fact that its building-up time should be short compared with the coherence duration. For this reason, the quality factor of the oscillator selected should not be too large. However, the quality factor should also not be too low since low-quality oscillators usually have high phase noise.

In an arrangement with a device for generating an oscillator signal and with a base station in which the base signal is generated and by which it is sent to the device, the oscillator signal can be sent back to the base station by the device as response signal to the base signal.

In an application in which the device communicates with a base station via base and oscillator signals as interrogating and response signals, the base station preferably has a band-pass filter, the center frequency of which approximately corresponds to the clock rate of the switching means, and/or means in order to eliminate the influence of the clock rate. Such means can be an additional mixer or a rectifier and a low-pass filter.

BRIEF DESCRIPTION OF THE DRAWING

Further advantageous features essential to the invention are obtained from the description of exemplary embodiments, referring to the drawings, in which.

DETAILED DESCRIPTION OF THE INVENTION

Figure 1:
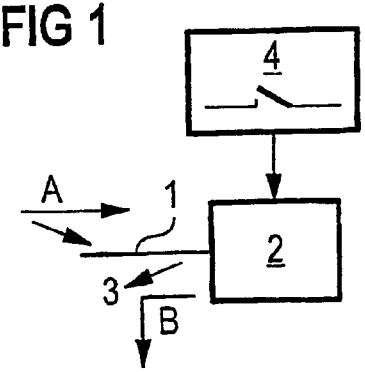
FIG. 1 shows a device with oscillator and switching means.

FIG. 1 shows the basic elements of the device. A more or less large proportion of a base signal A is coupled into an oscillator 2 via an input 1. For the examples shown, an electrical base signal and oscillator signal are used as a basis. However, the invention can also be implemented for optical, acoustic or other signals. The base signal A quasi-phase-coherently excites the oscillator 2 into oscillations, as a result of which the oscillator generates the signal B. The signal B is coupled out of the oscillator and delivered via an output 3. The input 1 for the base signal A and the output 4 for the oscillator signal B can be wholly or partially identical. However, they can also be implemented separately of one another.

The oscillator 2 is cyclically switched on and off by means of a switching means 4 for clock control. Its quasi-phase-coherent exciteability is also switched by the switching-on and -off.

The oscillator 2 is constructed in such a manner that, on the one hand, it is not excited into oscillation by thermal noise but, on the other hand, the base signal A coupled into it is sufficient for exciting quasi-phase-coherent oscillations with respect to the base signal A.

Figure 2:
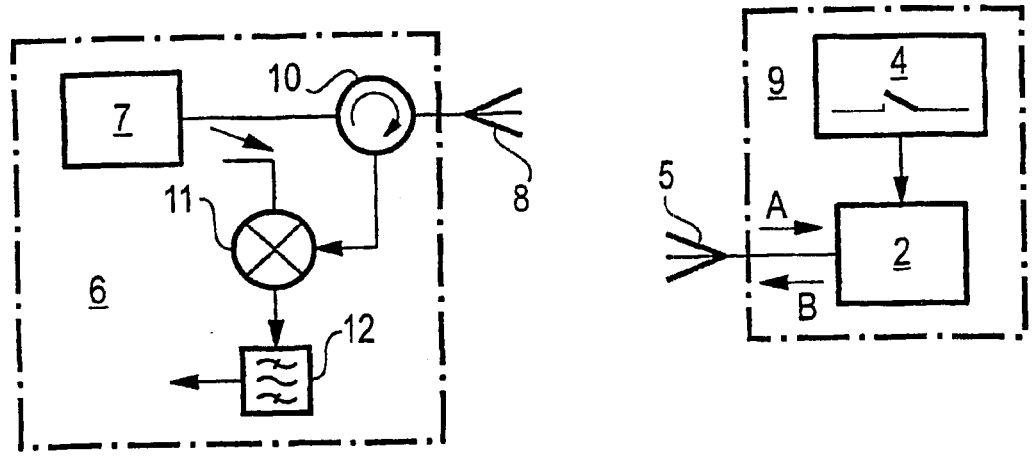
FIG. 2 shows an arrangement with base station and transponder.

FIG. 2 shows the arrangement of a transponder/backscattering system. The base signal A of the base station 6 is generated by means of a base station oscillator 7 and sent out via an antenna 8 of the base station 6. The base signal A of the base station 6 is received as interrogating signal by means of the antenna 5. The switched oscillator 2 is excited quasi-coherently with respect to the base signal A in the manner described above and oscillates in order to generate the oscillator signal B. The oscillator signal B is sent back as response signal via the antenna 5 of the transponder 9 and to the antenna 8 of the base station 6.

The oscillator signal B is here separated from the base signal A via a directional coupler 10 and mixed with a part of the signal from the base station oscillator 7 in a mixer 11. A filter 12 is used for suppressing the mixture components which are not of interest. This filter is preferably designed as a band-pass filter, the center frequency corresponding to the clock rate of the switching means 4. The arrangement presented can be used both for the purpose of communication or identification and for determining the distance or change in distance between the base station 6 and the transponder 9.

If the system is used for range finding, the base station 6 preferably contains other elements such as, for example, an additional mixer or a rectifier and a low-pass filter by means of which the influence of the clock rate is eliminated. However, the mixed signal can also be evaluated directly by means of suitable spectrum analysis, taking into consideration the influence of the clock rate.

It is also advantageous for range finding if the base station oscillator 7 is constructed as a variable-frequency oscillator, e.g. as VCO (Voltage Controlled Oscillator) so that the base signal A can assume more than one frequency value. In principle, all designs as in a conventional backscatterer are conceivable as are also listed in German patent application 19946161.9, reference to the complete content of which is herewith made. The difference of the present invention with respect to the known method consists in the type of transponder, namely that the base signal, the signal level of which is already distinctly attenuated by the transmission from the base station to the transponder, is not simply reflected but is generated in an actively constructed manner, almost free of noise, with a separate quasi-phase-coherent source and is then sent back with the full level of the source. Whilst otherwise operating similarly, the system according to the invention, therefore, has a significantly greater range or, respectively, a significantly higher signal/noise ratio than the system according to the prior art.

If the transponder 9 is used for identification as ID tag or for communication, the coding can be done, for example, by means of the clock rate of the switching means 4 and/or by means of an additional modulation unit by means of which the quasi-phase-coherent oscillator signal, before being sent back, is modulated. The type of modulation can correspond to the general prior art which has already been referred to above. Due to the quasi-phase-coherence of the two carrier signals, that is to say of the base signal A and the oscillator signal B, the demodulation in the base station 6 can be done simply and in an interference-proof manner. In addition, the abovementioned advantages compared with normal back-scattering ID systems for greater range are obtained. Control loops for any carrier recovery can be omitted in the arrangement according to the invention.

Figure 3:
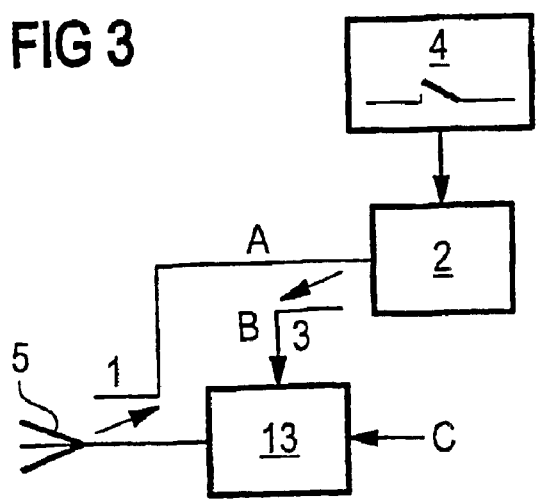
FIG. 3 shows a device with phase shifter for use as an ID tag.

Using the arrangement, the coding of an ID tag can be achieved, for instance by means of phase modulation. FIG. 3 shows a possible embodiment. Compared with the preceding transponder circuits, the system shown has only been extended by a modulator/phase shifter 13. Depending on the code value C, the quasi-phase-coherent oscillator signal is delayed by a particular phase value. In binary coding, this is, for example, by 90° or 180° in the case of the code value 1 and by 0° in the case of the code value 0. Amplitude or frequency coding is also conceivable. These types of modulation also result in the advantages with respect to the demodulation in the base station.

Figure 4:
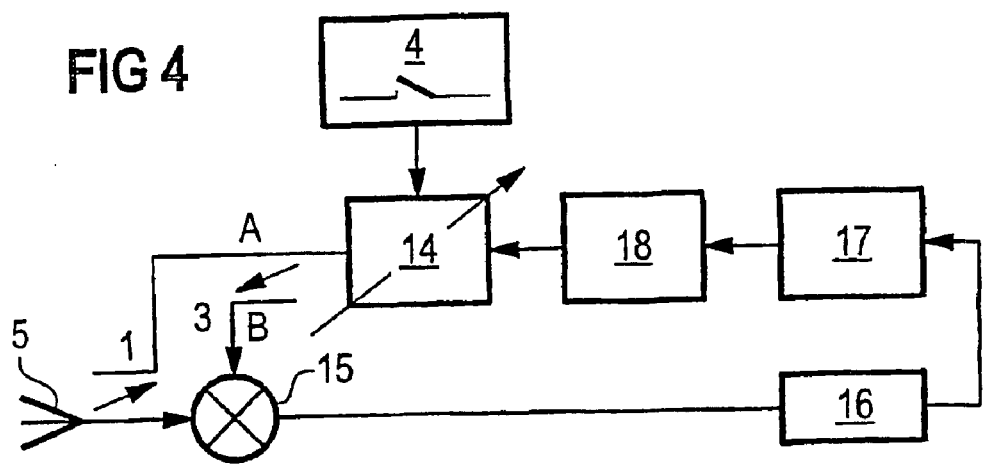
FIG. 4 shows a device with a variably-frequency oscillator.

The coherence duration depends on the frequency difference between the base signal A and oscillator signal B, that is to say on the frequency difference between the oscillator 2 and the base station oscillator 7. The more precisely the frequencies of the oscillators agree, the longer it is that the phases of the oscillators are almost identical. To increase the coherence duration and thus to be able to keep the clock rate of the switching means 4 low, it may be advantageous to provide means which are suitable for adaptively adapting the frequency of oscillation of the oscillator 2 to the frequency of the base signal A. FIG. 4 shows a possible embodiment of this. Differently from the base circuit from FIG. 1, this device does not have a fixed-frequency oscillator but a variable-frequency oscillator 14. A part of the oscillator signal B of the variable-frequency oscillator 14 is mixed with the base signal A by means of a mixer 15. The differential mixed signal is extracted by means of a filter 16, preferably a low-pass filter. The frequency of the differential mixed signal which is a measure of the frequency deviation of the two oscillators is then fed as correcting variable to a controller 18 following the signal preprocessing 17. The controller 18 corrects the oscillator 14 in such a manner that the frequency deviation between the two oscillators 14, 7 becomes as small as possible. The main task of the signal preprocessing 17 consists in determining the frequency. In principle, the frequency determination can be carried out in any circuit or signal processor of the prior art. Similarly, the controller 18 can be designed in accordance with the prior art. However, it should be pointed out expressly that only the frequency needs to be controlled, the phase coherence is obtained by the configuration of the device according to the invention. A phase-locked loop can, therefore, be omitted. Since it is generally unnecessary to select the clock rate of the switching means 4 to have a particularly low frequency, the controller 18 of the oscillator 14 also does not need to be especially precise. The limit for a small phase deviation of $\pi/10$, mentioned initially, is sufficient if the frequency deviation is ten times smaller than the clock frequency of the switching means 4.

In a numerical example: if the radio link is implemented at 24 GHz and the oscillator 2, 14 of the transponder 9 is switched at 100 MHz, the 24-GHz base station oscillator 7 and the 24-GHz oscillator 2, 14 are allowed to deviate from one another by up to 10 MHz in frequency. After each switch-on of the oscillator 2, 14, it oscillates quasi-phase-coherently with respect to the base signal A over 120 periods in the coherence time of 5 ns, that is to say the maximum deviation is $\pi/10$. After switching off and switching on again, another 120 quasi-phase-coherent oscillations are obtained, etc. From the point of view of information technology, the base signal A and the oscillator signal B are thus quasi-phase-coherent over a relatively long period.

When selecting the oscillator 2, 14, attention must be paid to the fact that its building-up time should be short compared with the coherence duration. For this reason, the quality factor of the oscillator 2, 14 should not be selected to be too large. With reference to the aforementioned numerical example, this means, for example, for a 24-GHz oscillator with, for example, a quality factor of 10, that it starts to oscillate within about 400 ps which is distinctly shorter than the coherence duration of 5 ns. However, the quality factor should not be designed to be too low either since low-quality oscillators usually have high phase noise. As has already been explained above, however, high phase noise can unnecessarily shorten the coherence duration. A suitable compromise must be made when selecting the oscillator 2, 14.

Figure 5:
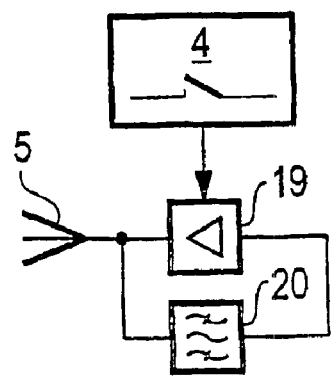
FIG. 5 shows a device with amplifier and resonator.

In the microwave range, oscillators are usually designed as resonant circuit. As can be seen from FIG. 5, such a resonant circuit consists of a radio-frequency transistor 19 to provide amplification and a resonator 20 or, respectively, band-pass filter. The resonator 20, for example, is an oscillating LC circuit or a dielectric structure. The circuit can be constructed, for example, in microstrip or coplanar technology. If the oscillator is connected to an antenna 5, it is particularly suitable for the principle described. The oscillator is switched, for example, by the amplifier 19 being switched on and off by means of the switching means 4.

The invention is particularly suitable for microwave systems with operating frequencies above 10 GHz since according to the current state of the art, the possibilities for direct phase control of the carrier are restricted or, respectively, very complex and expensive.

It should be noted that the general coherence between base signal and oscillator is only limited by the phase noise of the oscillator 2, 14 and of the base station oscillator 7. This is because, even if the frequencies of the two oscillators are different, the phase relationship between the signals still remains deterministic after the switching-on process, apart from the phase noise. In principle, all embodiments mentioned in the present invention can therefore also be used with slower switching clocks, that is to say those coherence durations which are only determined by the phase noise. In this case, the method only needs to ensure that the temporal phase change obtained due to the frequency difference between the two oscillators is taken into consideration or compensated for in the evaluation. For example, this can be done by means of additional mixers/demodulators on the hardware side or by suitable frequency and phase evaluation on the software side. As has already been shown, this additional expenditure can be advantageously avoided by the oscillator to be coupled being switched on and off with sufficient rapidity.

What is claimed is:

1. A device for generating an oscillator signal (B) based on a base signal (A), comprising
   an oscillator (2, 24) for the active construction of the oscillator signal (B) by means of oscillations,
   an input (1) for the base signal (A), and
   an output (3) for the oscillator signal (B) generated,
   wherein the oscillator (2) can be excited quasi-phase-coherently with respect to the base signal (A) by means of the base signal (A) for generating the oscillator signal (B).

2. The device as claimed in claim 1, further comprising switching means (4) for switching the quasi-phase-coherent exciteability of the oscillator (2).

3. The device as claimed in claim 2, wherein the switching means (4) is constructed in such a manner that the oscillator (2) can be switched in a predetermined sequence.

4. The device as claimed in claim 3, wherein the time between successive switching of the quasi-phase-coherent exciteability of the oscillator (2) is less than or equal to the coherence duration.

5. The device as claimed in claim 1, further comprising means (4) for switching the oscillator (2) off.

6. The device as claimed in claim 1, further comprising means (5) for sending out the oscillator signal (B).

7. The device as claimed in claim 3, further comprising means (4, 13) for coding the oscillator signal (B).

8. The device as claimed in claim 7, wherein the switching means is constructed as the means (4) for coding.

9. The device as claimed in claim 7, wherein the means (13) for coding is an additional modulation unit.

10. The device as claimed in claim 1, further comprising adapting means (15, 16, 17, 18) for adaptively adapting the frequency of the oscillator (2) to the frequency of the base signal (A).

11. The device as claimed in claim 1, wherein the oscillator (2) has a building-up time which is short compared with the coherence duration.

12. The device as claimed in claim 1, wherein the oscillator (2) can be excited by the fundamental mode and/or a subharmonic mode of the base signal (A).

13. An arrangement with a device as claimed in claim 3 and with a base station (6) for receiving the oscillator signal (B), wherein the base station (6) has a band-pass filter (12), the center frequency of which approximately corresponds to the clock rate.

14. The arrangement with a device as claimed in claim 3, and with a base station (6) for receiving the oscillator signal (B), wherein the base station (6) has means for eliminating the influence of the clock rate.

15. A method for generating an oscillator signal (B) on the basis of a base signal (A), which comprises
   exciting an oscillator (2) quasi-phase-coherently with respect to the base signal (A) by the base signal (A),
   oscillating the oscillator (2) following the excitation, and
   actively constructing an oscillator signal (B) with the oscillator due to the oscillation.

16. The device as claimed in claim 2, further comprising means (4) for switching the oscillator (2) off.

17. The device as claimed in claim 2, further comprising means (5) for sending out the oscillator signal (B).

18. The device as claimed in claim 1, further comprising means (4, 13) for coding the oscillator signal (B).

19. The device as claimed in claim 2, further comprising means (4, 13) for coding the oscillator signal (B).

20. The device as claimed in claim 2, further comprising adapting means (15, 16, 17, 18) for adaptively adapting the frequency of the oscillator (2) to the frequency of the base signal (A).

* * * * *